10

| | A | B | C | (NOR) 0 | 1 | 2 | 3 | (NAND) 127 | (AND) 128 | (OR) 254 |
|---|---|---|---|---|---|---|---|---|---|---|
| ABC | 1 | 1 | 1 | 0 | 0 | 0 | 0 | 0 | 1 | 1 |
| AB$\bar{C}$ | 1 | 1 | 0 | 0 | 0 | 0 | 0 | 1 | 0 | 1 |
| A$\bar{B}$C | 1 | 0 | 1 | 0 | 0 | 0 | 0 | 1 | 0 | 1 |
| A$\bar{B}\bar{C}$ | 1 | 0 | 0 | 0 | 0 | 0 | 0 | 1 | 0 | 1 |
| $\bar{A}$BC | 0 | 1 | 1 | 0 | 0 | 0 | 0 | 1 | 0 | 1 |
| $\bar{A}$B$\bar{C}$ | 0 | 1 | 0 | 0 | 0 | 0 | 0 | 1 | 0 | 1 |
| $\bar{A}\bar{B}$C | 0 | 0 | 1 | 0 | 0 | 1 | 1 | 1 | 0 | 1 |
| $\bar{A}\bar{B}\bar{C}$ | 0 | 0 | 0 | 0 | 1 | 0 | 1 | 1 | 0 | 0 |

3 7 6

INVENTORS
DONALD C. FORSLUND
RONALD WAXMAN
BY David N. Koppelman
ATTORNEY

FIG. 3

FUNCTION CHART

| | 0 | 1 | 2 | 3 | 4 | 5 | 6 | 7 |
|---|---|---|---|---|---|---|---|---|
| 0 | | $\bar{A}\bar{B}C$ 01t | $\bar{A}\bar{B}\bar{C}$ 01t | $\bar{A}\bar{B}0$ 01t | $\bar{A}BC$ 01t | $\bar{A}\bar{C}0$ 01t | $\bar{A}BC$ 02t | $\bar{B}\bar{A}\bar{C}$ 04t |
| 10 | $\bar{A}B\bar{C}$ 01t | $\bar{A}\bar{B}C$ 02t | $\bar{A}C0$ 01t | $\bar{B}\bar{A}C$ 04t | $\bar{A}B0$ 01t | $B\bar{A}\bar{C}$ 04t | $B\bar{A}C$ 04t | $\bar{A}10$ 01t |
| 20 | $A\bar{B}C$ 01t | $\bar{B}\bar{C}0$ 01t | $\bar{B}AC$ 02t | $\bar{A}\bar{B}\bar{C}$ 04t | $\bar{C}AB$ 02t | $\bar{A}\bar{C}\bar{B}$ 04t | $\bar{A}\bar{B}\bar{C}$ 05t | BAC 07c |
| 30 | $\bar{A}B\bar{C}$ 03t | $\bar{A}B\bar{C}$ 06t | $\bar{B}AC$ 06t | $AC\bar{B}$ 09t | $\bar{C}AB$ 06t | $AB\bar{C}$ 09t | $\bar{B}\bar{C}A$ 08c | BAC 04c |
| 40 | $A\bar{B}\bar{C}$ 01t | $\bar{B}\bar{A}C$ 02t | $\bar{B}C0$ 01t | $\bar{A}\bar{B}C$ 04t | $\bar{A}BC$ 03t | $\bar{B}A\bar{C}$ 06t | $\bar{A}BC$ 06t | $BC\bar{A}$ 09t |
| 50 | CAB 02t | $\bar{A}\bar{B}C$ 05t | $\bar{A}C\bar{B}$ 04t | $BA\bar{C}$ 07c | CAB 06t | $C\bar{B}A$ 08c | $\bar{A}B\bar{C}$ 09c | $BA\bar{C}$ 04c |
| 60 | $A\bar{B}0$ 01t | $A\bar{B}\bar{C}$ 04t | $A\bar{B}C$ 04t | $\bar{B}10$ 01t | $\bar{C}\bar{A}\bar{B}$ 06t | $BA\bar{C}$ 09t | $\bar{A}\bar{C}B$ 08c | ABC 04c |
| 70 | $C\bar{A}\bar{B}$ 06t | $C\bar{A}B$ 08c | $\bar{B}A\bar{C}$ 09c | $AB\bar{C}$ 04c | $1\bar{A}B$ 02c | $C\bar{A}B$ 06c | $\bar{C}\bar{A}B$ 06c | AB0 01c |
| 100 | ABC 01t | $\bar{C}\bar{A}B$ 02t | ABC 03t | $\bar{C}A\bar{B}$ 06t | $B\bar{C}0$ 01t | $\bar{A}\bar{C}B$ 04t | $\bar{A}\bar{B}\bar{C}$ 06t | $CB\bar{A}$ 09t |
| 110 | BAC 02t | $\bar{A}B\bar{C}$ 05t | BAC 06t | $B\bar{C}A$ 08c | $\bar{A}B\bar{C}$ 04t | $\bar{B}AC$ 07c | $\bar{A}C\bar{B}$ 09c | $\bar{B}AC$ 04c |
| 120 | $A\bar{C}0$ 01t | $A\bar{C}\bar{B}$ 04t | $\bar{B}\bar{A}C$ 06t | $CA\bar{B}$ 09t | $A\bar{C}B$ 04t | $\bar{C}10$ 01t | $\bar{A}\bar{B}C$ 08c | BCA 04c |
| 130 | $B\bar{A}\bar{C}$ 06t | $B\bar{A}C$ 08c | $1\bar{A}C$ 02c | $B\bar{A}C$ 06c | $\bar{C}A\bar{B}$ 09c | $AC\bar{B}$ 04c | $\bar{B}\bar{A}C$ 06c | AC0 01c |
| 140 | ABC 02t | $A\bar{B}\bar{C}$ 05t | ABC 06t | $A\bar{C}B$ 08c | $A\bar{B}C$ 06t | $A\bar{B}C$ 08c | $1\bar{B}C$ 02c | $A\bar{B}C$ 06c |
| 150 | ABC 05t | ABC 10t | ABC 08t | $AB\bar{C}$ 05c | ACB 08t | $A\bar{B}C$ 05c | $AB\bar{C}$ 06c | $A\bar{B}C$ 02c |
| 160 | $\bar{B}A\bar{C}$ 04t | $B\bar{A}C$ 07c | $\bar{B}C\bar{A}$ 09c | $\bar{A}BC$ 04c | $A\bar{B}C$ 09c | $\bar{A}CB$ 04c | $\bar{A}\bar{B}C$ 06c | BC0 01c |
| 170 | BCA 08t | $\bar{A}BC$ 05c | $BA\bar{C}$ 06c | $B\bar{A}C$ 02c | $CA\bar{B}$ 06c | $C\bar{A}B$ 02c | $\bar{A}\bar{B}C$ 03c | $AB\bar{C}$ 01c |
| 200 | $AB\bar{C}$ 01t | $\bar{A}BC$ 03t | $C\bar{A}B$ 02t | $CA\bar{B}$ 06t | $B\bar{A}C$ 02t | $BA\bar{C}$ 06t | $\bar{A}BC$ 05t | BCA 08c |
| 210 | BC0 01t | $\bar{A}BC$ 06t | $\bar{A}CB$ 04t | $A\bar{B}C$ 09t | $\bar{A}BC$ 04t | $\bar{B}C\bar{A}$ 09t | $B\bar{A}C$ 07t | $\bar{B}A\bar{C}$ 04c |
| 220 | $A\bar{B}C$ 02t | $AB\bar{C}$ 06t | $A\bar{B}C$ 05t | ACB 08c | $AB\bar{C}$ 05t | ABC 08c | ABC 10c | ABC 05c |
| 230 | $A\bar{B}C$ 06t | $1\bar{B}C$ 02t | $A\bar{B}C$ 08t | $A\bar{B}\bar{C}$ 06c | $A\bar{C}B$ 08t | ABC 06c | $A\bar{B}\bar{C}$ 05c | ABC 02c |
| 240 | AC0 01t | $\bar{B}AC$ 06t | $AC\bar{B}$ 04t | $\bar{C}A\bar{B}$ 09t | $B\bar{A}C$ 06t | $1\bar{A}C$ 02t | $B\bar{A}C$ 08t | $B\bar{A}\bar{C}$ 06c |
| 250 | BCA 04t | $\bar{A}BC$ 08t | $\bar{C}10$ 01t | $A\bar{C}B$ 04c | $CA\bar{B}$ 09c | $\bar{B}\bar{A}\bar{C}$ 06c | $A\bar{C}\bar{B}$ 04c | $A\bar{C}0$ 01c |
| 260 | $\bar{B}AC$ 04t | $\bar{A}C\bar{B}$ 09t | $\bar{B}AC$ 07t | $\bar{A}B\bar{C}$ 04c | $B\bar{C}A$ 08t | BAC 06c | $\bar{A}B\bar{C}$ 05c | BAC 02c |
| 270 | $CB\bar{A}$ 09c | $\bar{A}\bar{B}\bar{C}$ 06c | $\bar{A}\bar{C}B$ 04c | $B\bar{C}0$ 01c | $\bar{C}A\bar{B}$ 06c | ABC 03c | $\bar{C}\bar{A}B$ 02c | ABC 01c |
| 300 | AB0 01t | $\bar{C}AB$ 06t | $C\bar{A}B$ 06t | $1\bar{A}B$ 02t | $AB\bar{C}$ 04t | $\bar{B}A\bar{C}$ 09t | $C\bar{A}B$ 08t | $C\bar{A}\bar{B}$ 06c |
| 310 | ABC 04t | $\bar{A}\bar{C}B$ 08t | $BA\bar{C}$ 09c | $\bar{C}\bar{A}\bar{B}$ 06c | $\bar{B}10$ 01c | $A\bar{B}C$ 04c | $A\bar{B}\bar{C}$ 04c | $A\bar{B}0$ 01c |
| 320 | $BA\bar{C}$ 04t | $\bar{A}\bar{B}\bar{C}$ 09t | $C\bar{B}A$ 08t | CAB 06c | $BA\bar{C}$ 07t | $\bar{A}C\bar{B}$ 04c | $\bar{A}B\bar{C}$ 05c | CAB 02c |
| 330 | $BC\bar{A}$ 09c | $\bar{A}BC$ 06c | $\bar{B}A\bar{C}$ 06c | $\bar{A}BC$ 03c | $\bar{A}\bar{B}C$ 04c | $\bar{B}C0$ 01c | $\bar{B}\bar{A}C$ 02c | $A\bar{B}\bar{C}$ 01c |
| 340 | BAC 04t | $\bar{B}\bar{C}A$ 08t | $AB\bar{C}$ 09c | $\bar{C}AB$ 06c | $AC\bar{B}$ 09c | $\bar{B}AC$ 06c | $\bar{A}B\bar{C}$ 06c | $\bar{A}B\bar{C}$ 03c |
| 350 | BAC 07t | $\bar{A}\bar{B}\bar{C}$ 05c | $\bar{A}\bar{C}\bar{B}$ 04c | $\bar{C}AB$ 02c | $\bar{A}\bar{B}\bar{C}$ 04c | $\bar{B}AC$ 02c | $\bar{B}\bar{C}0$ 01c | $A\bar{B}C$ 01c |
| 360 | $\bar{A}10$ 01c | $B\bar{A}C$ 04c | $B\bar{A}\bar{C}$ 04c | $\bar{A}B0$ 01c | $\bar{B}\bar{A}C$ 04c | $\bar{A}C0$ 01c | $\bar{A}\bar{B}C$ 02c | $\bar{A}B\bar{C}$ 01c |
| 370 | $\bar{B}\bar{A}\bar{C}$ 04c | $\bar{A}BC$ 02c | $\bar{A}\bar{C}0$ 01c | $\bar{A}BC$ 01c | $\bar{A}\bar{B}0$ 01c | $\bar{A}\bar{B}\bar{C}$ 01c | $\bar{A}BC$ 01c | |

PIN CONNECTIONS

TERMINAL

| EQUIVALENCE CLASS | 32 | 34 | 36 | 38 | 48 | 40 | 42 |
|---|---|---|---|---|---|---|---|
| 1 | V1 | V2 | V3 | 1 | | 0 | 1 |
| 2 | V1 | V2 | 1 | V3 | | V1 | 1 |
| 3 | V1 | V2 | 1 | V3 | 40 | 48 | 1 |
| 4 | V1 | V2 | 0 | V3 | | V2 | 1 |
| 5 | V1 | V2 | V1 | V3 | 42 | V2 | 48 |
| 6 | V1 | V2 | 1 | V3 | | 1 | 1 |
| 7 | V1 | V2 | 0 | V3 | 42 | V2 | 48 |
| 8 | V1 | V2 | V1 | V3 | | 1 | 1 |
| 9 | 1 | V2 | V1 | 1 | | V3 | 1 |

3,428,903

MULTIPURPOSE LOGIC CIRCUIT FOR PERFORMING 254 OUT OF 256 DISCRETE LOGICAL COMBINATIONS OF THREE VARIABLES

Donald C. Forslund, Wappingers Falls, and Ronald Waxman, Poughkeepsie, N.Y., assignors to International Business Machines Corporation, Armonk, N.Y., a corporation of New York Filed Aug. 2, 1965, Ser. No. 476,397
U.S. Cl. 328—92 4 Claims
Int. Cl. H03k *19/36, 19/12;* G06f *7/38*

ABSTRACT OF THE DISCLOSURE

A universal logical block capable of performing 254 out of 256 discrete logical combinations of three variables is provided via the use of six discrete logical circuits. The multipurpose circuit is provided with six inputs, a true and a complement output and an interior terminal which may either be connected to other terminals or not as required for the performance of a logical function. Through the ability to permute any of the three variables to any of the inputs of the logical circuit in either the true or complement form and additionally to provide preset bias levels to any of the circuit's inputs, the multipurpose logic circuit is enabled to carry out the above stated large number of unique logical functions.

This invention relates to logic circuitry, and more particularly to a multipurpose logic circuit capable of performing a plurality of functions of three variables.

Multipurpose logic circuits, i.e., circuits capable of performing more than a single discrete logical function, have been known for years. Nevertheless, these circuits have not experienced wide-spread use in the data processing industry due to the fact that specially designed, minimal circuits have been found more economical. With present-day technologies however, (e.g., monolithic integrated circuits) the expense of the actual circuit components has become the least important factor. Thus, it is no longer the cost of the single circuit component which becomes important, but rather the cost of the processing steps which are required to produce the circuit and its myriad of components. In other words, whether a specific circuit with several circuit components or a plurality of circuits with many components is produced, the cost is substantially the same, since both can be produced by the same integrated circuit processing steps. For these reasons, it has become apparent that the economic rationale for not using multipurpose circuitry is no longer valid.

In U.S. Patent 3,028,088 to B. Dunham, assigned to the same assignee as is this application, a universal logic module is described which utilizes interconnections of binary full adders to provide the multipurpose logic function. No significant attempt is made in the Dunham patent to minimize the amount of circuitry required to perform the multipurpose logic function.

It is therefore an object of this invention to provide a multi-purpose type of information handling circuit.

Another object of this invention is to provide a logical building block capable of achieving a multiplicity of logical connectors for a given information system.

Still another object of this invention is to provide an information handling circuit wherein the greatest logic generality can be achieved.

And yet another object of this invention is to provide a multi-purpose logical circuit having a minimum of circuitry.

In accordance with the above stated objects, a minimal logical circuit capable of performing 254 out of 256 discrete logical combinations of three variables is provided via the use of six discrete logical circuits. The multipurpose circuit is provided with six inputs, a true and a complement output and an interior terminal which may either be connected to another terminal or not as required for the performance of a logical function. Through the ability to permute any of the three variables to any of the inputs of the logical circuit in either the true or complement form and to additionally provide preset bias levels to any of the circuits' inputs, the multipurpose logic circuit is enabled to carry out the above stated large number of unique logical functions.

In copending U.S. patent application Ser. No. 476,602, filed Aug. 2, 1965, now U.S. Patent 3,381,117 issued Apr. 30, 1968, entitled "Minimal Pin Multipurpose Logic Circuits" and assigned to the same assignee as this application, non-minimal logical circuits capable of performing 254 and 256 functions of three variables are disclosed, wherein the number of communicating terminals is minimized rather than the number of discrete logic circuits.

The foregoing and other objects, features and advantages of the invention will be apparent from the following more particular description of the preferred embodiment of the invention, as illustrated in the accompanying drawings:

FIG. 3 is a chart which describes all functions of three variables.

Figures 1, 2:
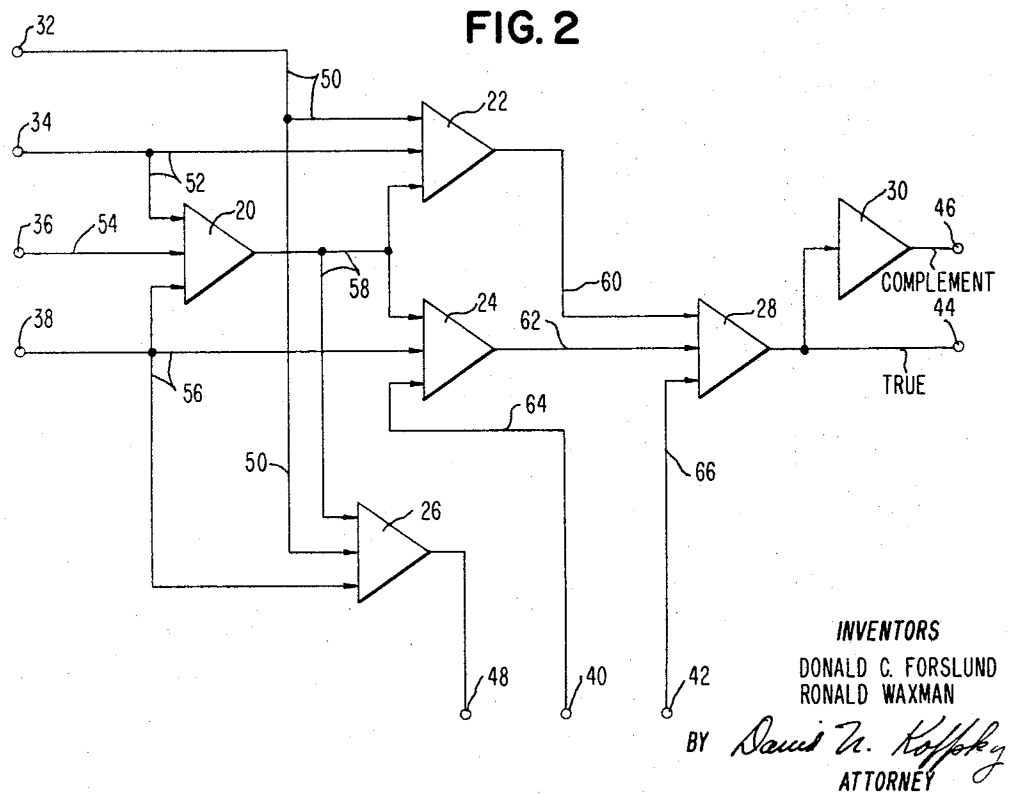
FIG. 1 is a truth table showing some of the functions of three variables.
FIG. 2 is the logic circuit which forms the subject of this invention.

Referring now to FIG. 1, a truth table is shown in which three input variables, A, B and C, are present in all possible combinatorial arrangements. While it has been shown that there are 256 unique combinations of three variables, only a few are shown in FIG. 1 for explanatory purposes. Each function occupies a column of the chart to the right of line 10 and is designated by the decimal equivalent of the binary value of the function. Thus, under decimal column 1, the binary number (00000001) is seen. Likewise, under column 127 appears its binary equivalent (—01111111). Certain of the functions shown in FIG. 1 have found widespread use in the data processing field and are indicated by the titles in parentheses above the columns. Thus, the function shown in column 1 is the well-known NOR function while the function in column 128 is the well-known AND function. Columns 127 and 254 respectively show the NAND and OR functions.

Others, in studying the functions of a plurality of variables and in paricular, three variables, have found that certain subsets of these functions exhibit likenesses (e.g. see the following articles by Dr. Leo Hellerman: an article entitled "Equivalence Classes of Logic Functions" which appeared in the magazine Computer Design, vol. 1, No. 1, 1962, at pp. 34–37; and "A Catalogue of Three Variable OR-Invert and AND-Invert Logical Circuits," Electronic Computer Transactions of IEEE, June 1963, at pp. 198–200). What has been determined is that a logical circuit capable of generating a specific one of the 256 logical combinations of three variables in response to inputs of the true form of the input variables, can also generate additional ones of the 256 logical functions by allowing the input variables to be interchanged or permuted between the circuit's input terminals. The same circuit has been shown to be capable of generating even more of the 256 logical functions of three variables if complements of the variables are available at the input terminals and a complement of the logical function output is provided. By still further providing logically constant bias levels in addition to the aforesaid true and complement inputs, even more of the logical functions can be provided from the same circuit. Discrete functions which exhibit this ability to be derived from a single logic circuit have been grouped into "equivalence classes."

By referring back to FIG. 1, the concept of an equivalence class will be better understood. To demonstrate that the NOR, NAND, AND, and OR logical functions all fall within the same equivalence class, one must merely take a circuit which performs one of these functions and provide both true and complement forms of the input variables and true and complement forms of the circuit's logical output. As an example, assume and AND circuit which provides both true and complement outputs. By definition, its true output will only provide an UP level when the input condition $A=1$, $B=1$, and $C=1$ occurs. Since the NAND function is the direct complement of the AND function, the complement output of the AND circuit will at all times reflect the NAND function. It is further well known, that any logic circuit which performs the AND function in positive logic, performs the OR function with complementary logic. Thus, all that is required to compel the exemplary AND circuit to perform the logical "OR" function is to complement each of the logical inputs and take the circuit's output from the complement output. As an example, assume the OR function of A, $\overline{B}$, $\overline{C}$ (i. e. $(A+\overline{B}+\overline{C})$) is desired from the AND circuit. The actual variable inputs to the AND circuit are $\overline{A}$, B, C. With these inputs (assuming $A=1$, $B=1$, $C=1$), the true output of the AND circuit remains at the DOWN logical level, and its complement output is at the UP level as it should be for the OR function $A+\overline{B}+\overline{C}$. This example can be extended to the NOR logical function which, through a similar analysis, can be shown to occur at the true output of the AND circuit when the complement of the input variables are utilized.

In previous studies, it has been shown that by utilizing only the true form of the input variables, the 256 logical functions of three variables can be partitioned into 80 equivalence classes. That is, all functions in the same equivalence class may be obtained from the same circuit by merely permuting the input variables. When both the true and complement of each variable is made available at the input to the circuit, the number of equivalence classes reduces to 22. The number of equivalence classes can further be reduced to 14 in the true and inverse form of the logic output is made available from the logic circuit. Four of these 14 classes are found to be denegerate, in that they are functions of one or two variables and may be obtained from certain of the nondegenerate equivalence classes by applying predetermined logical levels (biasing) to one or more of the logic circuits' input terminals or by connecting one or more variables to more than one input terminal. Hence, the 256 functions of three variables have been shown to reduce to ten equivalence classes and are obtainable from ten discrete circuits, providing true and complement inputs and outputs, permutation of inputs, and biasing are available.

While circuits have been suggested to perform one or more of the ten equivalence classes of three variables, no minimal circuit is known which will perform either all or substantially all of the ten equivalence classes. The circuit shown in FIG. 2 will perform nine out of the ten equivalence classes and, as a result, 254 out of 256 functions of three variables. The tenth equivalence class encompasses the Exclusive OR function of three variables and its complement and requires considerable additional circuitry. If this function is needed, specially constructed logic modules should be used.

Referring now to FIG. 2, a six logic block circuit is shown which is capable of performing 254 out of 256 of the logical functions of three variables. Each of logic blocks 20, 22, 24, 26, 28, and 30 is identical and is required to provide a logical inversion between its inputs and output. Other than this restriction, any of a number of well-known logic circuits can be utilized in the circuit of FIG. 2 (e.g. NOR, NAND). A preferred circuit is the NAND circuit which logically provides UP level outputs at all times except when the UP levels of the input variables are simultaneously present, at which time it produces a DOWN output. NAND circuits are well-known in the art and exemplary types may be found in "Handbook of Semiconductor Electronics," by L. Hunter at pages 15–59 (second edition–1962) published by McGraw-Hill.

Inputs to the circuit of FIG. 2 may be supplied through any of input terminals 32, 34, 36, 38, 40, and 42, while true and complement outputs may be taken from terminals 44 and 46 respectively. Terminal 48 provides an output for NAND circuit 26 and is selectively interconnected with terminals 40 or 42 when certain logic functions are required. Input terminal 32 is connected via conductors 50 to the inputs of NAND circuits 22 and 26, while input terminal 34 is connected to NAND circuits 20 and 22 via conductors 52. Terminal 36 is connected via conductor 54 to NAND circuit 20 and input terminal 38 is connected via conductors 56 to NAND circuits 20, 24, and 26. The output of NAND circuit 20 is coupled to NAND circuits 22, 24, and 26 via conductors 58, and the outputs of NAND circuits 22 and 24 are connected respectively via conductors 60 and 62 to inputs of NAND circuit 28. Terminals 40 and 42 are respectively connected via conductors 64 and 66 to inputs to NAND circuits 24 and 28 respectively. The output from NAND circuit 28 is applied directly to terminal 44 as the true output of the logic circuit and is additionally applied via NAND circuit 30 to terminal 46 to provide a complemented version of the output.

Figures 4, 5:
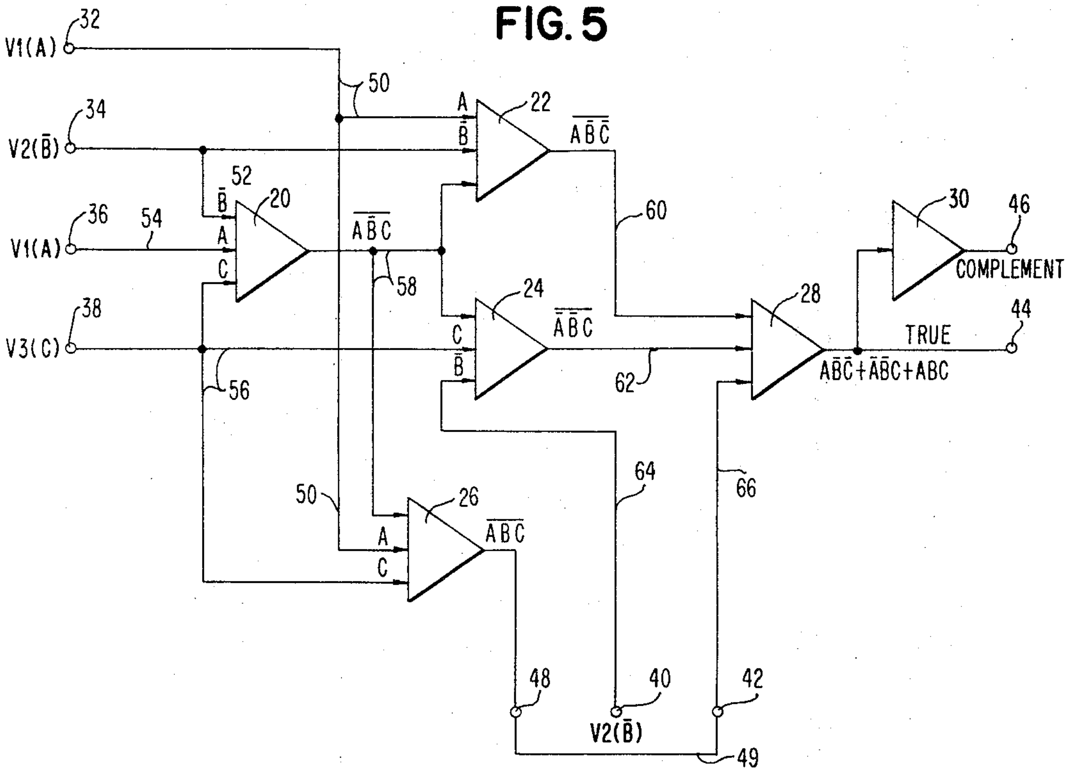
FIG. 4 is a chart which describes all of the connections required to allow the circuit of FIG. 2 to perform 254 out of 256 functions of three variables.
FIG. 5 is an example of the connections required to allow the circuit of FIG. 2 to perform a function of three variables.

To determine for circuit of FIG. 2 what inputs must be provided to which terminals to assure a desired output function at one of terminals 44 or 46, reference must be made to the charts of FIGS. 3 and 4. An octal notation has been adopted to simplify identification of each of the functions of the three variables. In brief, each of the 8 bit binary numbers which designates a particular function has been divided into three octal segments and corresponding octal numbers assigned to these segments. For instance, the octal designator for the OR function shown in FIG. 1 is 376, with the 6, or least significant octal digit being obtained from the decimal value of the three least significant binary digits (110); the 7 from the next three significant digits (111); and the 3 from the two most significant digits of the binary function number (11). Using this technique, it can be seen that the octal designator for the AND function is 200 and for the NAND functions is 177 etc.

FIG. 3 uses this notation and tabulates each of the 256 discrete functions of three variables in accordance with its corresponding octal designator, with the designator of each function being found on the horizontal and vertical axes of the chart. The group of characters found at the intersection of any two of these numbers indicates (1) the true or complement status and order of the variable inputs to the logic circuit of FIG. 2 (the significance of which will be discussed in greater detail hereinafter), (2) the equivalence class to which the specifically designated function belongs, and (3) whether the true or complement output of the circuit of FIG. 2 provides the desired function. More particularly, when a particular intersection in the chart of FIG. 3 is found which corresponds to the octal number of the function, the first three characters of the expression are indicative of the three variable inputs VI, V2, V3 to the circuit of FIG. 2. Upper case letters (e. g. A, B, C) indicate true inputs while barred letters ($\overline{A}$, $\overline{B}$, $\overline{C}$) indicate that the complemented form of the input should be applied. If the numeral one or zero appears as one of the first three characters, this indicates that a bias level corresponding to the "1" logical level or "0" logical level must be applied. The order in which the first three characters of the expression appear further indicates the correspondence of the respective variables A, B, and C to the variable inputs V1, V2, and V3 of the circuit of FIG. 2. (To determine exactly where the variable inputs V1, V2, and V3 must be applied will be shortly discussed in relation to the chart of FIG. 4.) The next two characters of the chart indicate to which of the equivalence classes the specific logical function belongs, and the final character (*t* or *c*) indicates whether the function is derived from true output 44 or complement output 46.

Once reference is made to the chart of FIG. 3 to determine the identity of a particular function's equivalence class, chart 4 can then be examined to determine the specific inputs which must be applied to the circuit of FIG. 2 to provide the desired function output. The vertical axis of the chart of FIG. 4 has noted thereon each of the equivalence classes and the specific circuit terminal numbers are plotted along the horizontal axis. At each intersection is indicated the specific variable inputs (V1, V2, V3) or logical bias which must be applied to the denoted terminal. At certain of the intersections (e.g. in the column corresponding to the terminal 48) the number of a terminal to which the specific terminal must be connected is shown. Thus, if it is determined that a specific logical function appears in the equivalence class 3, terminal 48 must be connected to terminal 40 to provide the logical function. A blank space in the chart means a floating or unused terminal.

Referring now to the truth table of FIG. 1 in combination with the charts of FIGS. 3 and 4, an example will be described to explain the operation of the multipurpose logic circuit of FIG. 2. Assume that the function $ABC+A\overline{BC}+\overline{AB}C$ must be implemented. The function is first set up in the form of a truth table, such as that shown in FIG. 1, and its binary equivalnet is derived. In this case, the binary number which describes the function is 10010010 (noting that 1's appear only opposite the functions ABC, $\overline{AB}$C, A$\overline{BC}$). The correspponding octal number is then derived from the binary number in the manner aforedescribed. In this case, the octal equivalent of 10, 010, 010 is 222. To determine which equivalence class function 222 belongs and the state of the logical inputs to be applied to the circuit of FIG. 2, requires that the chart of FIG. 3 be examined. The expression giving the aforementioned data is found at the intersection of the 220 line (on the horizontal axis) and the 2 line (on the vertical axis). The expression thus derived is A$\overline{B}$C05*t*. The first three characters i. e. A$\overline{B}$C, indicate that the true values of variables of A and C and the complemented value of variable B must be applied to the circuit of FIG. 2 and that A, $\overline{B}$, and C respectively correspond to variables V1, V2, and V3. The next two numbers, i.e. 05, indicates that the specific function belongs to the fifth equivalence class and provides the desired entry into the chart of FIG. 4. The last character, i.e. *t*, indicates that the desired function can be derived from the true output (terminal 44) of the circuit of FIG. 2.

Reference is now made to the chart of FIG. 4 and, in specific, to the horizontal line which relates to equivalence class 5. Upon this line, can be found the pin connections required to allow the circuit of FIG. 2 to perform its desired logical function. The circuit of FIG. 2 with the connections denoted in the chart of FIG. 4 is shown in FIG. 5. Variable V1(A) is applied to terminals 32 and 36, and variable V2($\overline{B}$) is applied to terminals 34 and 40. The third variable V3(C) is applied to terminal 38. Terminal 42 is connected to terminal 48 as indicated in the chart. At the output of each of the NAND circuits 20, 22, 24, 26, 28, and 30 is denoted the logic expression resulting from its inputs. As can be seen by the logical expression at the output of NAND circuit 28, the desired logic output is achieved.

To further illustrate the operation of the circuit of FIG. 5, assume that each of variables A, B, and C are at the 1 level. Corresponding UP level potentials will be applied to terminals 32, 36, and 38 (A and C) and DOWN level potentials will be applied to terminals 34 and 40($\overline{B}$). The $\overline{B}$ DOWN level on terminal 34 will be transmitted to NAND circuit 20 via conductor 52 and will force NAND circuit 20 to produce an UP level output on conductors 58. The same forcing action will occur at NAND circuits 22 and 24 by virtue of the $\overline{B}$ down logic levels on conductors 52 and 64 respectively. NAND circuit 26 has UP levels applied to all of its input conductors (50, 56, and 58) and thus produces a DOWN level at its output. This DOWN level is transmitted via terminal 48, jumper 49, terminal 42 and conductor 66 to NAND circuit 28. The DOWN level on conductor 66 forces NAND circuit 28 to produce an UP level thereby indicating the desired logical condition at terminal 44. (ABC.)

A similar exercise will show that if logical conditions corresponding to A$\overline{BC}$ or $\overline{AB}$C are applied to the input terminals to the circuit, that UP level outputs will appear at terminal 44. The complement will appear at terminal 46.

If it is determined that a logical function of less than three variables is required, a bias input to one or more of the input terminals to the circuit of FIG. 2 must be applied. Function 231 (chart of FIG. 3) is such a function 1$\overline{B}$C. From an examination of the chart of FIG. 4, (equivalence class 2) it can be seen that the 1 bias level (V1) is applied to terminals 32 and 40 respectively, $\overline{B}$ to terminals 34 (V2), C to terminal 38 (V3) and additional one level biases to terminals 36 and 42 respectively.

While the invention has been particularly shown and described with reference to a preferred embodiment thereof, it will be understood by those skilled in the art that the foregoing and other changes in form and details may be made therein without departing from the spirit and scope of the invention.

We claim:

1. In a multipurpose logic circuit capable of at least providing 254 out of 256 logical functions of three variables, the combination comprising:

first, second, third, fourth, fifth and sixth inverting logic circuits, first, second, third, fourth, fifth, and sixth input terminals, each said input terminal adapted to receive the true or complement form of any of said three variables or a constant bias level, circuit means connecting said first input terminal to said second and fourth inverting logic circuits, said second input terminal to said first and second inverting logic circuits, said third input terminal to said first inverting logic circuit, said fourth input terminal to said first, third and fourth inverting logic circuits, said fifth input terminal to said third inverting logic circuit, and said sixth input terminal to said fifth inverting logic circuit, additional circuit means connecting the output from said first inverting logic circuit to inputs of said second, third and fourth inverting logic circuits, the outputs of said second and third inverting logic circuits to inputs of said fifth inverting logic circuits and the output of said fifth inverting logic circuit to an input of said sixth inverting logic circuit, first, second, and third output terminals connected to outputs of said fourth, fifth, and sixth inverting logic circuits respectively, said second and third output terminals providing the true and complement logic outputs for said multipurpose logic circuit, said first output terminal being adapted to be interconnected to other input terminals when certain logic function outputs are desired.

2. The invention defined in claim 1 wherein said inverting logic circuits are NAND circuits.

3. The invention defined in claim 1 wherein said inverting logic circuits are NOR circuits.

4. The invention as defined in claim 1 wherein the inputs to said first through sixth input terminals and the interconnections of said first output terminal are determined from the chart of FIG. 4 and the equivalence class of the specific function, the order of the variables and the desired output terminal is determined by reference to the chart of FIG. 3.

References Cited

UNITED STATES PATENTS 3,226,565 12/1965 Earle -------------- 307—214

JOHN S. HEYMAN, *Primary Examiner.*

DONALD D. FORRER, *Assistant Examiner.*

U.S. Cl. X.R.

235—164; 307—215, 203